(12) United States Patent
Walia

(10) Patent No.: US 10,579,834 B2
(45) Date of Patent: Mar. 3, 2020

(54) METHOD AND APPARATUS FOR FACILITATING CUSTOMER INTENT PREDICTION

(71) Applicant: [24]7.AI, INC., San Jose, CA (US)

(72) Inventor: Anmol Walia, San Jose, CA (US)

(73) Assignee: [24]7.ai, Inc., San Jose, CA (US)

( * ) Notice: Subject to any disclaimer, the term of this patent is extended or adjusted under 35 U.S.C. 154(b) by 0 days.

(21) Appl. No.: 15/335,189

(22) Filed: Oct. 26, 2016

(65) Prior Publication Data

US 2017/0116177 A1 Apr. 27, 2017

Related U.S. Application Data

(60) Provisional application No. 62/246,544, filed on Oct. 26, 2015.

(51) Int. Cl.
*G06F 17/27* (2006.01)
*G06F 40/35* (2020.01)
(Continued)

(52) U.S. Cl.
CPC .......... *G06F 40/35* (2020.01); *G06F 16/3329* (2019.01); *G06F 16/3335* (2019.01);
(Continued)

(58) Field of Classification Search
CPC ..... G10L 15/22; G10L 15/26; G10L 15/1822; G10L 15/183; G10L 15/197; G10L 17/02;
(Continued)

(56) References Cited

U.S. PATENT DOCUMENTS 5,970,449 A * 10/1999 Alleva ................. G06F 17/271
704/235
6,453,307 B1 * 9/2002 Schapire ............. G06K 9/6256
706/12

(Continued)

OTHER PUBLICATIONS

Brill, et al. "An Improved Error Model for Noisy Channel Spelling Correction" Association for Computational Linguistics, Oct. 3, 2000, pp. 286-293.

*Primary Examiner* — Michael Ortiz-Sanchez
(74) *Attorney, Agent, or Firm* — Perkins Coie LLP; Michael A. Glenn

(57) ABSTRACT

A computer-implemented method and an apparatus facilitate customer intent prediction. The method includes receiving natural language communication provided by a customer on at least one enterprise related interaction channel. Textual data corresponding to the natural language communication is generated by converting one or more non-textual portions in the natural language communication to a text form. One or more processing operations are performed on the textual data to generate normalized text. The normalized text is configured to facilitate interpretation of the natural language communication. At least one intention of the customer is predicted, at least in part, based on the normalized text and a reply is provisioned to the customer based on the predicted intention. The reply is provisioned to the customer on the at least one enterprise related interaction channel in response to the natural language communication.

34 Claims, 6 Drawing Sheets

(51) Int. Cl.
*H04M 7/00* (2006.01)
*H04M 3/51* (2006.01)
*G06F 16/332* (2019.01)
*G06F 16/33* (2019.01)
*G06F 40/129* (2020.01)
*G06F 40/232* (2020.01)
*G06F 40/242* (2020.01)
*G06F 40/295* (2020.01)

(52) U.S. Cl.
CPC .......... *G06F 40/129* (2020.01); *G06F 40/232* (2020.01); *G06F 40/242* (2020.01); *G06F 40/295* (2020.01); *H04M 3/5166* (2013.01); *H04M 7/0045* (2013.01)

(58) Field of Classification Search
CPC . G10L 2015/223; G10L 15/193; G10L 15/18; G10L 15/1815; G10L 17/22; G10L 2015/088; G10L 25/48; G10L 15/14; G10L 15/19; G10L 15/265; G10L 21/00; G10L 25/54; G10L 15/183; G10L 2015/088; G10L 15/193; G06F 17/2785; G06F 17/2775; G06F 17/2795; G06F 17/28; G06F 17/27; G06F 17/271; G06F 3/167; G06F 17/2765; G06F 17/30401; G06F 17/30554; G06F 17/273; G06F 17/274; G06F 17/30386; G06F 17/30389; G06F 17/30634; G06F 17/30654; G06F 17/30684; G06F 17/20; G06F 17/21; G06F 17/3043; H04M 1/271; H04M 2201/40; H04M 3/493; H04M 11/045; H04M 3/4936
See application file for complete search history.

(56) References Cited

U.S. PATENT DOCUMENTS

| | | | | |
|---|---|---|---|---|
| 6,901,399 B1 * | 5/2005 | Corston | ............ | G06F 17/30684 |
| 7,197,460 B1 * | 3/2007 | Gupta | ............ | G06F 3/167 |
| | | | | 704/270.1 |
| 7,328,146 B1 * | 2/2008 | Alshawi | ............ | G06F 17/28 |
| | | | | 704/1 |
| 7,617,093 B2 * | 11/2009 | Ramsey | ............ | G06F 17/2765 |
| | | | | 345/506 |
| 7,835,910 B1 * | 11/2010 | Hakkani-Tur | ............ | G10L 15/063 |
| | | | | 704/10 |
| 7,860,713 B2 * | 12/2010 | Alonso | ............ | G10L 15/063 |
| | | | | 704/236 |
| 7,869,998 B1 * | 1/2011 | Di Fabbrizio | ............ | G10L 13/00 |
| | | | | 704/1 |
| 8,600,922 B2 * | 12/2013 | Adriaansen | ............ | G06F 17/27 |
| | | | | 706/46 |
| 8,856,004 B2 * | 10/2014 | Basson | ............ | G10L 15/063 |
| | | | | 704/235 |
| 9,330,659 B2 * | 5/2016 | Ju | ............ | G10L 15/063 |
| 9,633,674 B2 * | 4/2017 | Sinha | ............ | G10L 25/00 |
| 9,721,566 B2 * | 8/2017 | Newendorp | ............ | G10L 15/32 |
| 9,858,925 B2 * | 1/2018 | Gruber | ............ | G10L 15/183 |
| 2002/0022956 A1 * | 2/2002 | Ukrainczyk | ............ | G06F 17/218 |
| | | | | 704/9 |
| 2002/0040359 A1 * | 4/2002 | Green | ............ | G06F 17/2785 |
| 2005/0165607 A1 * | 7/2005 | Di Fabbrizio | ............ | G06F 17/2785 |
| | | | | 704/256 |
| 2010/0049684 A1 * | 2/2010 | Adriaansen | ............ | G06F 17/27 |
| | | | | 706/46 |
| 2010/0057463 A1 * | 3/2010 | Weng | ............ | G06F 17/27 |
| | | | | 704/257 |
| 2010/0180198 A1 | 7/2010 | Iakobashvili et al. | | |
| 2011/0238407 A1 * | 9/2011 | Kent | ............ | G06F 17/289 |
| | | | | 704/3 |
| 2012/0265528 A1 * | 10/2012 | Gruber | ............ | G10L 15/18 |
| | | | | 704/235 |
| 2013/0080149 A1 | 3/2013 | Mccombs et al. | | |
| 2014/0149121 A1 | 5/2014 | Di Fabbrizio et al. | | |
| 2015/0186355 A1 * | 7/2015 | Baldwin | ............ | G06F 17/273 |
| | | | | 704/9 |
| 2015/0269125 A1 | 9/2015 | Desai et al. | | |
| 2015/0286747 A1 * | 10/2015 | Anastasakos | ............ | G06F 17/30917 |
| | | | | 707/776 |
| 2015/0288818 A1 | 10/2015 | Srivastava et al. | | |
| 2015/0324469 A1 * | 11/2015 | Keyngnaert | ............ | G06F 17/30867 |
| | | | | 707/706 |
| 2016/0253989 A1 * | 9/2016 | Kuo | ............ | G10L 15/183 |
| | | | | 704/257 |
| 2016/0379638 A1 * | 12/2016 | Basye | ............ | G06F 17/30764 |
| | | | | 704/235 |
| 2017/0075877 A1 * | 3/2017 | Lepeltier | ............ | G06F 17/2705 |
| 2017/0085506 A1 * | 3/2017 | Gordon | ............ | H04L 51/046 |

* cited by examiner

METHOD AND APPARATUS FOR FACILITATING CUSTOMER INTENT PREDICTION

CROSS REFERENCE TO RELATED APPLICATIONS

This application claims priority to U.S. provisional patent application Ser. No. 62/246,544, filed Oct. 26, 2015, which is incorporated herein in its entirety by this reference thereto.

TECHNICAL FIELD

The present technology generally relates to natural language customer interactions with customer support representatives of an enterprise, and more particularly to a method and apparatus for facilitating customer intent prediction from natural language interactions of customers for improving customer interaction experiences.

BACKGROUND

Enterprises and their customers interact with each other for a variety of purposes. For example, enterprises may engage with existing customers and potential customers to draw the customer's attention towards a product or a service, to provide information about an event of customer interest, to offer incentives and discounts, to solicit feedback, to provide billing related information, and the like. Similarly, the customers may initiate interactions with the enterprises to enquire about products/services of interest, to resolve concerns, to make payments, to lodge complaints, and the like.

Typically, a customer may wish to interact with a customer support representative of an enterprise using a natural language form of communication. Communicating in such a manner enables the customer to express her/his intent easily via voice, chat, email, etc. and to obtain the desired outcomes.

To support the customer's desire for natural language form of communication, many enterprises provide automated systems, such as for example automatic voice recognition (AVR)/interactive voice response (IVR) based interaction systems, chat assistants and the like, to capture customer requests, process them, and then perform required action to meet the customer's objectives.

These automated systems are typically scripted or menu based. From the perspective of the customer, these automated systems can be frustrating because they are constructed using too many menus, too many menu options, missing options, and so on and so forth. From the enterprise's point of view, processing of natural language interactions can be difficult because of speaker accent, word choice, spelling errors, slang, abbreviations, customers asking questions unrelated to the enterprise, and the like.

When a customer becomes frustrated, she or he can exit the interaction, perhaps never to return From the point of view of the enterprise, frustrating and unsuccessful customer interactions result in no sales and are therefore bad for business.

SUMMARY

In an embodiment of the invention, a computer-implemented method for facilitating customer intent prediction is disclosed. The method receives, by a processor, natural language communication provided by a customer on at least one enterprise related interaction channel. If the natural language communication includes one or more non-textual portions, the method converts, by the processor, the one or more non-textual portions to a text form to generate textual data corresponding to the natural language communication. The textual content associated with the natural language communication configures the textual data if the natural language communication does not include non-textual portions. The method performs, by the processor, at least one processing operation on the textual data to generate normalized text corresponding to the natural language communication. The normalized text is configured to facilitate interpretation of the natural language communication provided by the customer. The method predicts, by the processor, at least one intention of the customer, at least in part, based on the normalized text corresponding to the natural language communication. The method causes, by the processor, a provisioning of a reply to the customer based on the at least one intention. The reply is provisioned to the customer on the at least one enterprise related interaction Channel in response to the natural language communication.

In another embodiment of the invention, an apparatus for facilitating customer intent prediction includes at least one processor and a memory. The memory stores machine executable instructions therein, that when executed by the at least one processor, causes the apparatus to receive natural language communication provided by a customer on at least one enterprise related interaction channel. If the natural language communication includes one or more non-textual portions, the apparatus is caused to convert the one or more non-textual portions to a text form to generate textual data corresponding to the natural language communication Textual content associated with the natural language communication configures the textual data if the natural language communication does not include non-textual portions. The apparatus is further caused to perform at least one processing operation on the textual data to generate normalized text corresponding to the natural language communication. The normalized text is configured to facilitate interpretation of the natural language communication provided by the customer. The apparatus is further caused to predict at least one intention of the customer, at least in part, based on the normalized text corresponding to the natural language communication and cause a provisioning of a reply to the customer based on the at least one intention. The reply is provisioned to the customer on the at least one enterprise related interaction channel in response to the natural language communication.

In another embodiment of the invention, an apparatus for facilitating customer intent prediction includes at least one communication interface, a textual data generator, a normalization module and a prediction module. The at least one communication interface is configured to receive natural language communication provided by a customer on at least one enterprise related interaction channel. The textual data generator is configured to convert one or more non-textual portions to a text form to generate textual data corresponding to the natural language communication if the natural language communication includes one or more non-textual portions. Textual content associated with the natural language communication configures the textual data if the natural language communication does not include non-textual portions. The normalization module is configured to perform at least one processing operation on the textual data to generate normalized text corresponding to the natural language communication. The normalized text is configured to facilitate interpretation of the natural language communication provided by the customer. The prediction module is configured to predict at least one intention of the customer, at least in part, based on the normalized text corresponding to the natural language communication. The communication interface is caused to provision a reply to the customer based on the at least one intention. The reply is provisioned to the customer on the at least one enterprise related interaction channel in response to the natural language communication.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Typically, customers prefer natural language form of communication when communicating with customer support representatives or agents of an enterprise. In many scenarios, a customer support representative is an automated agent, for example a chat bot or an interactive voice response (IVR) system. Though the automated agents use various tools like automated speech recognition (ASR), speech-to-text convertor, and the like, to interpret natural language communication from customers, in many scenarios, the interpretation of natural language communication falls short of what is required to provide a seamless customer service experience. Even in case of human agents (for example, voice agents or chat agents), the interpretation of natural language communication from customers may be difficult in some scenarios on account of customer-spoken accents, slangs, abbreviations, spelling errors, etc. Various embodiments of the present technology provide methods and apparatuses for accurately interpreting natural language communication of customers and for facilitating customer intent prediction from interpreted natural language communication to provide an improved interaction experience to the customers.

In some embodiments, the natural language communication received from customers from one or more interaction channels and/or multiple devices is converted into a common format, such as a text format. Several processing operations are performed on the textual data corresponding to the natural language communication to generate normalized text. Some non-exhaustive examples of processing operations include replacing regularly used expressions, removing stop-words, spelling corrections, stemming words, substituting words with word classes, replacing abbreviations and acronyms, removing white spaces, and the like. Such processing operations are performed to clean the textual data to facilitate correct machine analysis of the natural language communication. One or more classifiers are then applied to the cleaned or normalized text to predict at least one intention of the customer.

In some embodiments, one or more recommendations to provide a personalized interaction experience to the customer are determined using the predicted intention(s) of the customer. A reply is then provided to the customer in response to the natural language communication using the one or more recommendations. Various aspects of the present disclosure are explained hereinafter with reference to FIGS. 1 to 6.

Figure 1:
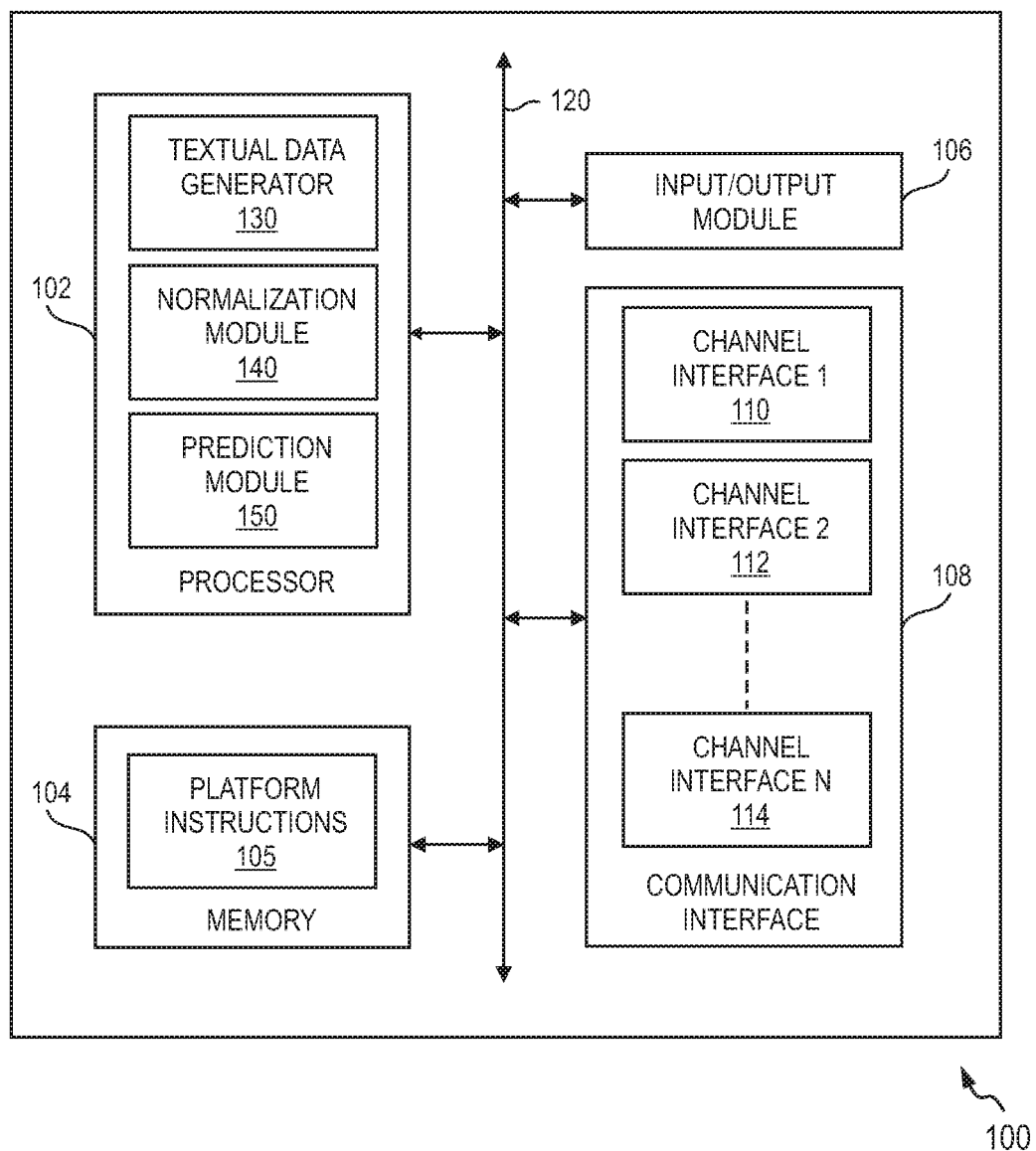
FIG. 1 is a block diagram of an apparatus configured to facilitate customer intent prediction, in accordance with an embodiment of the invention.

FIG. 1 is a block diagram of an apparatus 100 configured to facilitate customer intent prediction, in accordance with an embodiment of the invention. The term 'customer' as used herein refers to either an existing user or a potential user of enterprise offerings such as products, services and/or information. Moreover, the term 'customer' of the enterprise may refer to an individual, a group of individuals, an organizational entity, etc. The term 'enterprise' as used herein may refer to a corporation, an institution, a small/medium sized company or even a brick and mortar entity. For example, the enterprise may be a banking enterprise, an educational institution, a financial trading enterprise, an aviation company, a consumer goods enterprise or any such public or private sector enterprise.

Generally, a customer may initiate an interaction with an enterprise with some purpose in mind. For example, the customer may contact a customer support representative of an enterprise to troubleshoot an issue with a recently purchased product. In another illustrative example, a customer may chat with a virtual agent to seek clarification of a product return policy. The apparatus 100 may be caused to predict a customer's likely intention for initiating an interaction with the enterprise and thereafter facilitate provisioning of required assistance to the customer. The term 'facilitating customer intent prediction' as used herein refers to analyzing customer interaction information along with any previous interaction data associated with the customer and predicting one or more likely intentions of the customer for interacting with the an agent of an enterprise. The term 'agent' as used herein may refer to a human agent or a virtual agent capable of assisting customers with their respective needs. Some examples of human agents may include voice agents, chat agents, and the like. Some examples of virtual agents may include a chatbot, an interactive voice response (IVR) system, and the like.

The apparatus 100 includes at least one processor, such as a processor 102 and a memory 104. It is noted that although the apparatus 100 is depicted to include only one processor, the apparatus 100 may include more number of processors therein. In an embodiment, the memory 104 is capable of storing machine executable instructions, referred to herein as platform instructions 105. Further, the processor 102 is capable of executing the platform instructions 105. In an embodiment, the processor 102 may be embodied as a multi-core processor, a single core processor, or a combination of one or more multi-core processors and one or more single core processors. For example, the processor 102 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 102 may be configured to execute hard-coded functionality. In an embodiment, the processor 102 is embodied as an executor of software instructions, wherein the instructions may specifically configure the processor 102 to perform the algorithms and/or operations described herein when the instructions are executed.

The memory 104 may be embodied as one or more volatile memory devices, one or more non-volatile memory devices, and/or a combination of one or more volatile memory devices and non-volatile memory devices. For example, the memory 104 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-RAV (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.)

The apparatus 100 also includes an input/output module 106 (hereinafter referred to as 'I/O module 106') and at least one communication interface such as the communication interface 108. The I/O module 106 is configured to facilitate provisioning of an output to a user of the apparatus 100. In an embodiment, the I/O module 106 may be configured to provide a user interface (UI) configured to provide options or any other display to the user. The I/O module 106 may also include mechanisms configured to receive inputs from the user of the apparatus 100. The I/O module 106 is configured to be in communication with the processor 102 and the memory 104. Examples of the I/O module 106 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 102 may include I/O circuitry configured to control at least some functions of one or more elements of the I/O module 106, such as, for example, a speaker, a microphone, a display, and/or the like. The processor 102 and/or the I/O circuitry may be configured to control one or more functions of the one or more elements of the I/O module 106 through computer program instructions, for example, software and/or firmware, stored on a memory, for example, the memory 104, and/or the like, accessible to the processor 102.

The communication interface 108 is depicted to include several channel interfaces to communicate with a plurality of enterprise related interaction channels. As an illustrative example, the communication interface 108 is depicted to include channel interfaces 110, 112 to 114 (depicted as 'Channel 1', 'Channel 2' to 'Channel N' in FIG. 1, respectively) to communicate with the plurality of enterprise related interaction channels. Some non-limiting examples of the enterprise related interaction channels may include a Web channel (i.e. an enterprise Website), a voice channel (i.e. voice-based customer support), a chat channel (i.e. a chat support), a native mobile application channel, a social media channel and the like. Each channel interface may be associated with a respective communication circuitry such as for example, a transceiver circuitry including antenna and other communication media interfaces to connect to a wired and/or wireless communication network. The communication circuitry associated with each channel interface may, in at least some example embodiments, enable transmission of data signals and/or reception of signals from remote network entities, such as Web servers hosting enterprise Website or a server at a customer support or service center configured to maintain real-time information related to interactions between customers and agents.

In at least one example embodiment, the channel interfaces are configured to receive up-to-date information related to the customer-enterprise interactions from the enterprise related interaction channels. In some embodiments, the information may also be collated from the plurality of devices utilized by the customers. To that effect, the communication interface 108 may be in operative communication with various customer touch points, such as electronic devices associated with the customers, Websites visited by the customers, devices used by customer support representatives (for example, voice agents, chat agents, IVR systems, in-store agents, and the like) engaged by the customers and the like.

In an embodiment, the information received for each customer includes profile data and interaction data corresponding to respective customer's interactions with the enterprise. A customer's profile data may include profile information related to the customer, such as for example, a customer's name and contact details, information relating to products and services associated with the customer, social media account information, information related to other messaging or sharing platforms used by the customer, recent transactions, customer interests and preferences, customer's credit history, history of bill payments, credit score, memberships, history of travel, and the like. In some exemplary embodiments, the customer information may also include calendar information associated with the customer. For example, the calendar information may include information related to an availability of the customer during the duration of the day/week/month.

In an embodiment, interaction data received corresponding to a customer may include information such as enterprise website related Web pages visited, queries entered, chat entries, purchases made, exit points from Websites visited, decisions made, mobile screens touched, work flow steps completed, sequence of steps taken, engagement time, IVR speech nodes touched, IVR prompts heard, widgets/screens/buttons selected or clicked, historical session experiences and results, customer relationship management (CRM) state and state changes, agent wrap-up notes, speech recordings/ transcripts, chat transcripts, survey feedback, channels touched/used, sequence of channels touched/used, instructions, information, answers, actions given/performed by either enterprise system or agents for the customer, and the like. In some example scenarios, the interaction data may include information related to past interactions of the customer with resources at a customer support facility, the types of channels used for interactions, customer channel preferences, types of customer issues involved, whether the issues were resolved or not, the frequency of interactions and the like.

The communication interface 108 is configured to facilitate reception of such information related to the customers in real-time or on a periodic basis. Moreover, the information may be received by the communication interface 108 in an online mode or an offline mode. In an embodiment, the communication interface 108 provides the received information to the memory 104 for storage purposes. In an embodiment, the information related to each customer is labeled with some customer identification information (for example, a customer name, a unique ID and the like) prior to storing the information in the memory 104.

The communication interface 108 may further be configured to receive information related to an on-going interaction in real-time and provide the information to the processor 102. In at least some embodiments, the communication interface 108 may include relevant application programming interfaces (APIs) to communicate with remote data gathering servers associated with the various enterprise related interaction channels. Moreover, the communication between the communication interface 108 and the remote data gathering servers may be realized over various types of wired or wireless networks.

In an embodiment, various components of the apparatus 100, such as the processor 102, the memory 104, the I/O module 106 and the communication interface 108 are configured to communicate with each other via or through a centralized circuit system 120. The centralized circuit system 120 may be various devices configured to, among other things, provide or enable communication between the components (102-108) of the apparatus 100. In certain embodiments, the centralized circuit system 120 may be a central printed circuit board (PCB) such as a motherboard, a main board, a system board, or a logic board. The centralized circuit system 120 may also, or alternatively, include other printed circuit assemblies (PCAs) or communication channel media.

It is noted that the apparatus 100 as illustrated and hereinafter described is merely illustrative of an apparatus that could benefit from embodiments of the invention and, therefore, should not be taken to limit the scope of the invention. It is noted that the apparatus 100 may include fewer or more components than those depicted in FIG. 1. In an embodiment, the apparatus 100 may be implemented as a platform including a mix of existing open systems, proprietary systems and third party systems. In another embodiment, the apparatus 100 may be implemented completely as a platform including a set of software layers on top of existing hardware systems. In an embodiment, one or more components of the apparatus 100 may be deployed in a Webserver. In another embodiment, the apparatus 100 may be a standalone component in a remote machine connected to a communication network and capable of executing a set of instructions (sequential and/or otherwise) so as to facilitate customer intent prediction from natural language communication provided by the customer. Moreover, the apparatus 100 may be implemented as a centralized system, or, alternatively, the various components of the apparatus 100 may be deployed in a distributed manner while being operatively coupled to each other. In an embodiment, one or more functionalities of the apparatus 100 may also be embodied as a client within devices, such as customers' devices. In another embodiment, the apparatus 100 may be a central system that is shared by or accessible to each of such devices.

The prediction of customer intents from natural language communication of customers by the apparatus 100 is hereinafter explained with reference to one customer. It is noted the apparatus 100 may be caused to facilitate customer intent prediction for several customers in a similar manner.

In at least one example embodiment, the processor 102 is configured to, with the content of the memory 104, cause the apparatus 100 to receive natural language communication provided by a customer on at least one enterprise related interaction channel More specifically, the communication interface 108 of the apparatus 100 may receive natural language communication provided by the customer on an enterprise related interaction channels. The term 'natural language communication' as used herein refers to general manner of communication between two individual entities. For example, a customer may ask, "what is the due date for my landline bill?" to a chat agent. In another illustrative example, a customer may verbally complain "The delivery of my shipment has been delayed by two days now. This is unacceptable!" to a voice agent. Such form of communication, whether in verbal or textual form, may be termed herein as natural language communication. It is noted that such form of communication is different from other forms of customer-enterprise communication, such as those involving selection of menu options during an IVR based interaction or choosing buttons in online Web forms or questionnaires, to seek assistance.

In an illustrative example, more than one interaction channel can be used during the customer—enterprise interaction. For example, the customer can initiate the interaction through a Web browser, and the enterprise can send a chat invitation, a Web link, or an email, or open a pop-up window on the customer's device. It is also noted that the added channel can be on an additional device. For example, a customer can start a voice exchange using her or his smart phone, and then may add an interaction channel such as a Web browser using a laptop or tablet, in response to receiving an emailed invitation containing a link to a Web page. From the enterprise perspective, the original voice channel and the added Web channel or other channel can be used to better understand the customer's intent and therefore better serve both customer needs and organizational business objectives. The multiple interaction channels/devices used by the customer for interacting with the enterprise are hereinafter collectively referred to as 'multiple modes' and the interaction data related to an interaction captured from multiple modes is hereinafter referred to as 'multi-modal' data. In at least one embodiment, interaction data including voice, chat and Web journey/search terms that are employed by the customer and the enterprise during an interaction can be linked, and such multi-modal can be captured. The captured multi-modal data including the natural language communication may thereafter be stored in the memory 104. It is noted that multi-modal data may, in some embodiments, be more useful than the data captured from an individual channel/device alone because each channel/device may carry additional and perhaps unique information related to customer intent.

In at least one example embodiment, if the natural language communication includes one or more non-textual portions (for example, speech portions), the apparatus 100 is caused to convert the one or more non-textual portions to a text form to generate textual data corresponding to the natural language communication. If the natural language communication does not include non-textual portions, then textual content associated with the natural language communication may configure the textual data. To that effect, the processor 102 is depicted to include a textual data generator 130. In at least one example embodiment, textual data generator 130 is configured to check if the received natural language communication is in speech form or in text form or in a combined form (for example, a customer may provide product details over chat while speaking to an agent on phone. The textual data generator 130 may be configured to convert the non-textual portions (for example, speech portions) in the natural language communication to text form. The converted text portions along with remaining textual portions of the natural language communication may together configure the textual data corresponding to the natural language communication. If the natural language communication only includes textual portions, then all of the textual content corresponding to the natural language communication may configure the textual data. In at least one example embodiment, the textual data generator 130 may fetch machine instructions (or software programs) stored in the memory 104 for automatic speech recognition (ASR) and statistical learning models (SIND to perform speech-to-text conversion and thereby convert non-textual portions to a text form.

It is noted that, the captured multi-modal data may also include text-based data obtained from textual chat, email, Web forums, Web journeys, and from Web search terms. The textual data corresponding to the natural language communication along with such text-based data may be used for prediction of at least one customer intention as will be explained later.

In at least one example embodiment, the processor 102 is configured to, with the content of the memory 104, cause the apparatus 100 to perform at least one processing operation on the textual data to generate normalized text corresponding to the natural language communication. The normalized text is configured to facilitate interpretation of the natural language communication provided by the customer. The normalization of the textual data may be performed to convert the multi-modal text data into meaningful, analyzable text. For example, the normalization of text is performed to standardize spelling, dates and email addresses, disambiguate punctuation, etc.

For example, may ways exist for a customer to request product information, state a date on the calendar and a particular time of day, state a currency amount, request credit card account information etc. In an illustrative example, dates entered as 15 May 2015 or May 15, 2015 may be normalized to 2015.05.15. Converting the date and time to normalized forms may provide several benefits, such as for example simplifying the search for flight or ticket information and the like. In another illustrative example, numbers entered with different delimiters to separate 1000s or different decimal amounts can be normalized. It is understood that as a direct benefit converting the data reduces errors, ambiguities, and data 'noise'. Moreover, the normalized text data conveys the meaning of the data even when the original data is in a nonstandard or perhaps ambiguous format. Furthermore, converting the text data into a normalized form also reduces the number of dimensions of the search space that must be explored during classification in order to understand the customer data.

Some non-exhaustive examples of the operations performed by the processor 102 for normalization of text include converting all characters in the text data to lower-case letters, stemming, stop-word removal, spell checking, regular expression replacement, removing all characters and symbols that are not letters in the English alphabet, substituting symbols, abbreviations, and word classes with English words, replacing two or more space characters, tab delimiters, and newline characters with a single space character, and the like.

In FIG. 1, the processor 102 is depicted to include a normalization module 140. In at least one example embodiment, the normalization module 140 may include several sub-modules, with each sub-module configured to perform at least one processing operation on the textual data. The various sub-modules of the normalization module 140 are explained in further detail with reference to FIG. 2.

Figure 2:
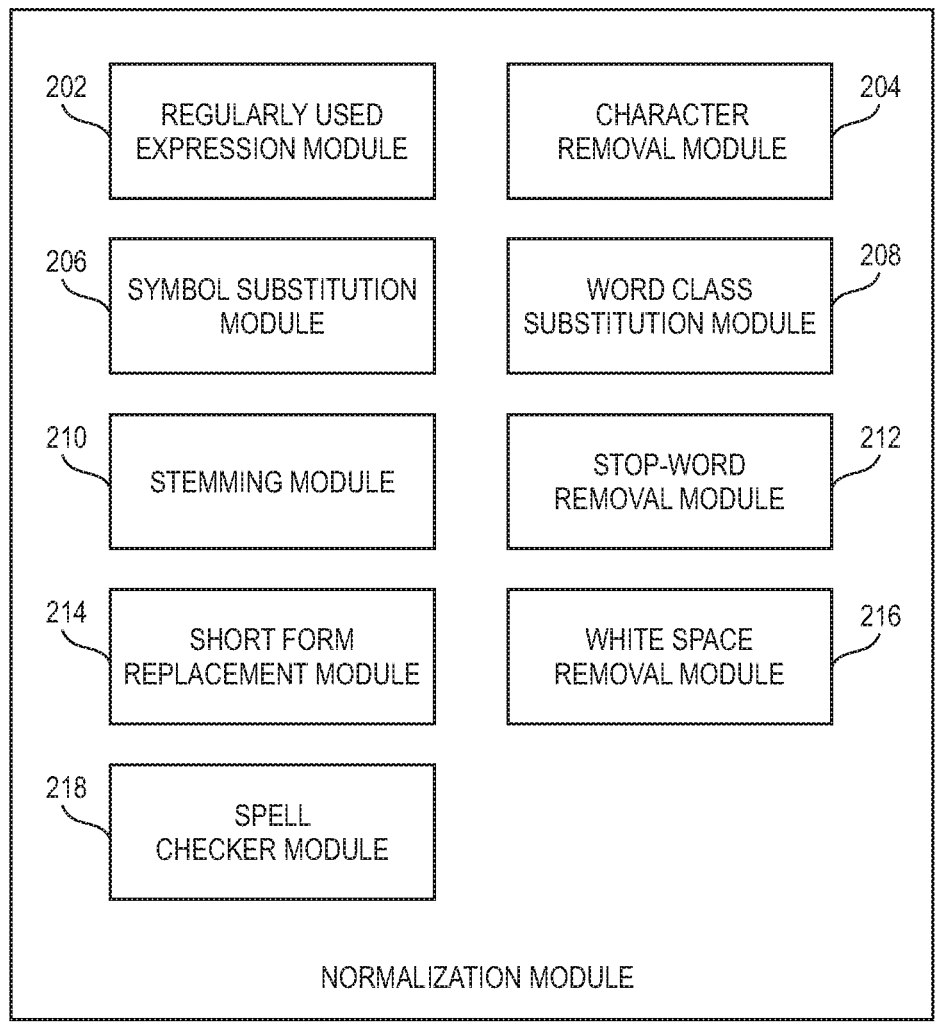
FIG. 2 depicts a block diagram of a normalization module configured to facilitate generation of normalized text from textual data corresponding to the natural language communication provided by the customer, in accordance with an embodiment of the invention.

FIG. 2 depicts a block diagram of the normalization module 140 configured to facilitate generation of normalized text from textual data corresponding to the natural language communication provided by the customer, in accordance with an embodiment of the invention. Though one or more processing operations performed on the textual data corresponding to the natural language communication are depicted to be performed by various sub-modules of the normalization module 140, it is noted that, in at least some embodiments, the processor 102, in conjunction with platform instructions 105 stored in the memory 104, may be configured to perform the various processing operations while precluding the normalization module 140. In such scenarios, the processor 102 of the apparatus 100 may perform the functionalities of the various sub-modules of the normalization module 140 as will be explained hereinafter.

The normalization module 140 is depicted to include a regularly used expression module 202, a character removal module 204, a symbol substitution module 206, a word class substitution module 208, a stemming module 210, a stop-word removal module 212, a short form replacement module 214, a white space removal module 216 and a spell checker module 218.

In at least one example embodiment, the regularly used expression module 202 is configured to determine if the textual data includes one or more regularly used expressions. Some non-exhaustive examples of regularly used expressions include common expressions such as a date expression, a time expression, a currency expression, an email expression, a phone number expression, an account number expression and the like. If the textual data includes one or more regularly used expressions, the regularly used expression module 202 is configured to determine if each regularly used expression in the textual data is expressed in a respective predetermined format. If a regularly used expression in the textual data is not expressed in the respective predetermined format, the regularly used expression module 202 is configured to replace a current format of the regularly used expression with the respective predetermined format in the textual data. For example, the customer may enter a time in the form "ten-oh-three p m" and a date in the form "Jul. 25, 2015". The regularly used expression module 202 may determine that such current formats of time and date are different than the respective predetermined time and date formats. In such a scenario, the regularly used expression module 202 may recast the time "ten-oh-three p m" into a standard form i.e. predetermined time format) such as "2203" and the date "Jul. 25, 2015" may be recast to "20150727". In another illustrative example, a customer may refer to currency as US dollar or USD or with a '$' sign. The regularly used expression module 202 may determine that such current formats of the regularly used currency expressions are not in a respective predetermined format. Accordingly, the regularly used expression module 202 may replace the current format with a predetermined currency format of 'dollar' Similarly, phone numbers, email ids, account numbers, flight codes, and the like, may be identified in the textual data and replaced with the respective predetermined formats if the current formats of such regularly used expressions are not expressed in a respective predetermined format.

In at least one example embodiment, the character removal module 204 is configured to identify non-English characters in the textual data and remove the non-English Characters from the textual data. As an illustrative example, the character removal module 204 may remove emoticons, a string of special characters, non-text characters, apostrophes in contractions of two words, and the like, from the textual data.

In at least one example embodiment, the symbol substitution module 206 is configured to substitute symbols with equivalent word representations. For example, the word "dollar" can be substituted for the symbol "$", the word "and" for "&", the word "number" for "#", and the like. Similarly, other characters and symbols may also be substituted with suitable word representations.

In at least one example embodiment, the word class substitution module 208 is configured to determine if the textual data includes at least one word corresponding to a name of an individual, a relation of an individual, a profession of an individual, a gender of an individual or a location of an individual. The word class substitution module 208 is configured to substitute such words in the textual data with a respective word class. For example, word class substitutions may include substituting words such as "India" with "_class_international_location", substituting "brother" with "class family", and the like.

In at least one example embodiment, the stemming module 210 is configured to determine if one or more words from among a plurality of words configuring the textual data are extensions of word stems. For example, in many scenarios, it is observed that customer input may contain variations of a word, where the variations can include alternative forms of the word such as plural, adjectival, adverbial, and so on. The stem or stems of the various forms can be reductions of the forms to a single root. Accordingly, the stemming module 210 is configured to replace the one or more words with corresponding word stems. More specifically, the process of stemming involves removal of the ends of words and/or aggregate standard forms of same word or synonym to reduce inflectional forms for the same family of related words, or to reduce the dimensionality of textual content being processed. The stemming also reduces complexity by mapping words that refer to a same basic concept to a single root. For example, words like family, families, families', and familial may be converted to 'family'. In an embodiment, the stemming module 210 may or may not include re-normalization. For example, for words like "applying", "application", "applied", a non-normalized word stem may be "appl", while the re-normalized word may be a dictionary word like "apply". The stemming module 210 may use algorithms stored in the memory 104 for replacing words with stems in the textual data. Some examples of such algorithms may include stemming algorithms like Porter stemmer, Snowball stemmer, Lancaster stemmer modules, and the like.

The stop-word removal module 212 is configured to remove stop-words in the textual data. It is understood that stop-words can be words that do not contain important or particular significance to the customer interaction. Non-exhaustive examples of stop-words include words like "a", "the", "is", "yet", and the like.

The short form replacement module 214 is configured to replace abbreviations, slangs and acronyms in the textual data with corresponding full-word representations. For example, words "good", "gd" or "gooood" may be normalized to "good" and words like "I'll" may be normalized to "I will". Further, abbreviation substitutions may include substituting the word "account" for "acc", "credit card" for "cc", and so on. In other illustrative example, misspellings like "kno" and "knuw" may be normalized to "know". Moreover, the short form replacement module 214 may also be configured to normalize acronyms, for example, "NY" may be normalized to "New York" or "gr8" may be normalized to "great", and the like.

The white space removal module 216 is configured to replace two or more consecutive spaces, tab delimiters, and newlines in the textual data with single spaces. For example, the textual data may be noisy and may include two or more consecutive spaces, tab delimiters, newlines, and other characters that are not useful to the customer interaction. The two or more consecutive spaces, tab delimiters, and newlines may be replaced with a single space character. It is understood that using single space character may improve processing of the textual data without changing the context and/or meaning of the customer interaction.

In at least one example embodiment, the spell checker module 218 is configured to perform a spelling check of words configuring the textual data. If one or more words with incorrect spellings are identified in the textual data during the spelling check, the spell checker module 218 is configured to correct the incorrect spellings of words in the textual data. In an embodiment, corrections of spellings may be performed based on a library of correct spellings (such as for example, a third-party library such as Enchant) and pre-trained statistical language models (SLM). An example sequence of steps for performing spelling correction is explained later with reference to FIG. 4.

In an embodiment, the normalization of textual data may be performed based on a variety of functions including standardized functions and those based on client specification/preference. For example, enterprises may provide a specific word list related to client products and/or services to be exempted during spell checking and so on and so forth. In at least one example embodiment, a default ordering of operations to be performed for normalization of textual data can be defined. One example sequence of operations for normalization of textual data includes: replace email addresses, replace URLs, replace special symbols, replace regular expressions (time, date, dollar amount, etc.), replace string-lookup based word classes, abbreviations, and symbols, remove white spaces, and spell checking. The order in which the processing operations for normalization of textual data are sequenced may be fixed or may be customized by a user of the apparatus 100 (or prescribed by the enterprise). An example sequence of processing operations for normalizing textual data corresponding to natural language communication provided by a customer is explained with reference to FIG. 3.

Figure 3:
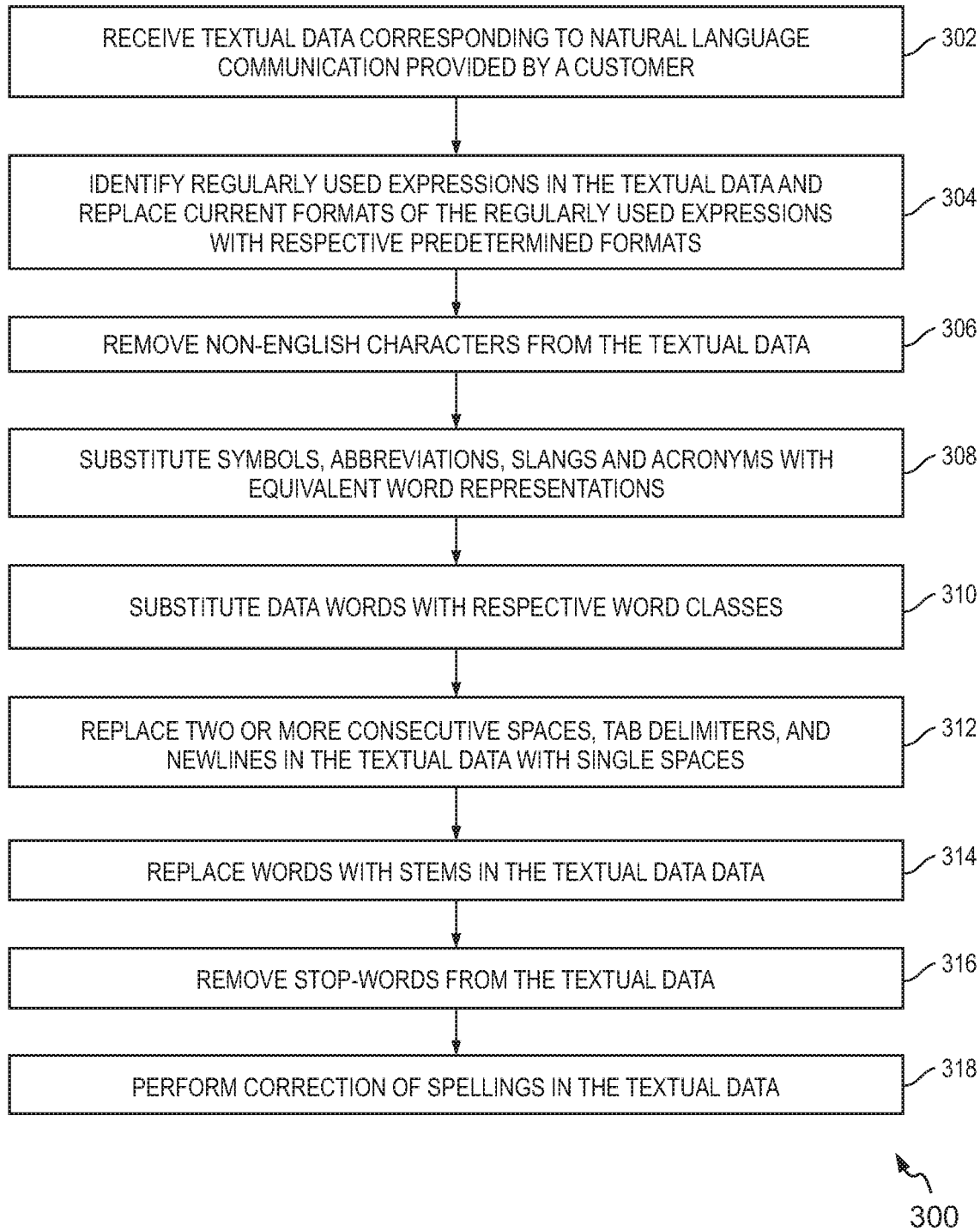
FIG. 3 shows an example sequence of processing operations for generating normalized data, in accordance with an embodiment of the invention.

FIG. 3 shows an example sequence 300 of processing operations (hereinafter referred to as flow 300) for generating normalized data, in accordance with an embodiment of the invention. As explained with reference to FIG. 1, normalization of the textual data converts noisy customer communication to clean textual data that can be processed for various purposes including determining customer intent. In an embodiment, the flow 300 may be executed by a normalization module, such as the normalization module 140 explained with reference to FIG. 2, or the flow 300 may be executed by a processor, such as the processor 102 explained with reference to FIG. 1. Alternatively, one or more operations of the flow 300 may be executed using hardware, software, firmware or combination thereof.

At operation 302, the flow 300 includes receiving textual data corresponding to natural language communication provided by a customer. At operation 304, the flow 300 includes identifying regularly used expressions in the textual data and replacing current formats of the regularly used expressions with respective predetermined formats. Some examples of regularly used expressions include common expressions such as a date expression, a time expression, a currency expression, an email expression, a phone number expression, and the like. If a regularly used expression in the textual data is not expressed in the respective predetermined format, a current format of the regularly used expression is replaced with the respective predetermined format in the textual data. The replacement may be performed as explained with reference to FIG. 2 and is not explained again herein.

At operation 306, the flow 300 includes removing non-English characters from the textual data. At operation 308, the flow 300 includes substituting symbols, abbreviations, slangs and acronyms with equivalent word representations. The removal of non-English characters and the substitution of symbols, abbreviations, slangs and acronyms may be performed as explained with reference to FIG. 2 and are not explained again herein.

At operation 310, the flow 300 includes substituting data words with respective word classes. For example, word class substitutions may include substituting words such as "Doctor" with "_class profession_", substituting name such as "John" with "_class male_", and the like. At operation 312, the flow 300 includes replacing two or more consecutive spaces, tab delimiters, and newlines in the textual data with single spaces. At operation 314, the flow 300 includes replacing words with stems in the textual data data. As explained with reference to FIG. 2, the process of stemming involves removal of the ends of words and/or aggregate standard forms of the same word or synonym to reduce inflectional forms for the same family of related words, or to reduce the dimensionality of textual content being processed. The stemming also reduces complexity by mapping words that refer to a same basic concept to a single root.

At operation 316, the flow 300 includes removing stop-words from the textual data. Some examples of the stop-words include words like "a", "the", "is", "yet" and the like. At operation 318, the flow 300 includes performing correction of spellings in the textual data. An example sequence of operations for performing correction of spellings is explained with reference to FIG. 4.

Figure 4:
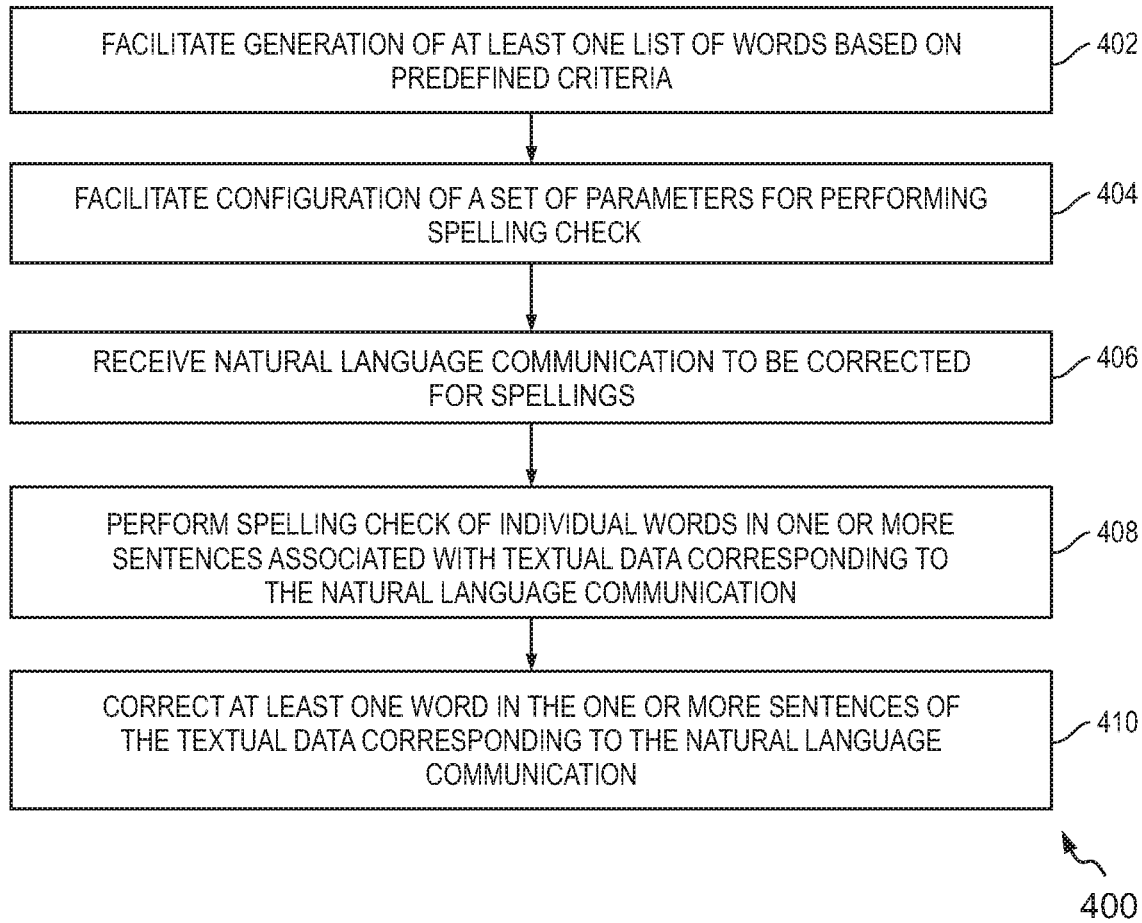
FIG. 4 shows an example sequence of operations for performing spelling correction of textual data corresponding to the natural language communication, in accordance with an embodiment of the invention.

Referring now to FIG. 4, an example sequence 400 of operations (hereinafter referred to as flow 400) for performing spelling correction of textual data is shown, in accordance with an embodiment of the invention. In an embodiment, the flow 400 may be executed by a spell checker module, such as the spell checker module 218 explained with reference to FIG. 2, or the flow 400 may be executed by a processor, such as the processor 102 explained with reference to FIG. 1. Alternatively, one or more operations of the flow 400 may be executed using hardware, software, firmware or combination thereof.

At operation 402, the flow 400 includes facilitating generation of at least one list of words based on predefined criteria. In an at least one example embodiment, the I/O module 106 of the apparatus 100 may be configured to display a user interface (UI) capable of receiving one or more list of words from a user of the apparatus 100 to facilitate generation of at least one list of words. The list of words may be provisioned based on user defined criteria (or even based on suggestion provided by the apparatus 100 based on machine learning). For example, a criterion may correspond to listing words that occur frequently or words that occur as proper nouns and as common nouns. For example, "Bill" can refer to a person, while "bill" can refer to amount owed. A word list can include words that always appear as proper nouns. For example, the list of proper nouns can include "Tom", "Mary", and so on and so forth. In an example embodiment, the user of the apparatus 100 may provision a list of words that correspond to enterprise offerings, such as product names, service labels, etc. Accordingly, the apparatus 100 may facilitate generation of one or more list of words.

At operation 404, the flow 400 facilitates configuration of a set of parameters for performing the spelling check. More specifically, the apparatus 100 may facilitate configuration of a set of parameters for performing the spelling check. In an at least one example embodiment, the I/O module 106 of the apparatus 100 may be configured to display a user interface (UI) capable of receiving input related to various settings to facilitate configuration of a set of parameters for performing the spelling check. For example, the configured parameters may include setting values for a number of suggestions to retrieve from a dictionary and/or weights for error models and for language models, such as for example, interpolation weight between unigram and bigram language models etc. In an embodiment, the configured parameters may suggest an n-gram SLM model to be used for processing purposes. The parameters can be integer values, real values, floating-point values, and the like.

At 406, the flow 400 includes receiving the natural language communication to be corrected for spellings. The natural language communication may include one or more sentences of textual data in partially normalized form (for example, the one or more sentences in the natural language communication may have differently expressed regularly used expressions replaced; slangs, abbreviations, symbols, acronyms substituted; stop-words removed; stemming of words performed, and the like as explained with reference to FIG. 2). Furthermore, the one or more sentences may include all the word classes identified and marked.

At operation 408, the flow 400 includes performing spelling check of individual words in one or more sentences associated with the textual data corresponding to the natural language communication. In at least one example embodiment, performing spelling check of a word involves checking whether the word is greater than one character in length. If the word is one character in length, then the checking continues with the next word. If the word is greater than one character in length, then a dictionary lookup of the word is performed. It is noted that any dictionary, either stored in the memory 104 or accessed from a third-party database using the communication interface 108, may be used for performing the dictionary lookup of the word. When the word is found in the dictionary, then the word can be checked for presence in one or more list of words, and if present, the word may be identified as a potential proper noun, and so on. When the word is not found in the dictionary, the dictionary can be used to determine suggestions for the word. As explained above, the number of suggestions retrieved may be configured as per preset configuration parameters. When multiple suggestions for the word are available, a scoring technique can be used. To score each suggestion, in at least one example embodiment, the spelling check of the word involves generating an n-gram model for developing a context window for the word. The context window may include any number of words to the left of the word and any number of words to the right of the word. A score may be calculated for each of the top suggestions from the dictionary. It is understood that the suggestions can be split by a space/delimiter. When there is more than one word, the words may also be concatenated. Furthermore, the top suggestions may also be selected based on word length.

In one embodiment, an error model may be used for scoring each suggestion. In an illustrative example, a difference between the proposed correction (for example, correction of one character, two characters, so on and so forth) may be estimated and amount of error may be determined based on the estimated difference. In another embodiment, a score for each suggestion may be computed using an SLM. Alternatively, the SLM can calculate an SLM log probability. In an embodiment, the score from the error model and the score from the SLM can be combined using parameters, for example weights, as described above. The suggestions can be ordered based on their scores. It is noted that such generation of suggestions may be performed for each incorrectly spelled word.

At operation 410, the flow 400 includes correcting at least one word in the one or more sentences of the textual data corresponding to the natural language communication. In an embodiment, the correction can be based on the comparison of the SLM log probabilities of a word with those of suggestions for the word. In at least one example embodiment, the correction of a word may involve replacing the word with the highest scored suggestion.

In some embodiments, the flow 400 may further include outputting the normalized one or more sentences of the textual data. In an embodiment, the normalized one or more sentences in the textual data may include proper nouns replaced by a 'class_name' tag or other tag and spelling errors can be replaced by their corrections.

As explained with reference to FIGS. 2, 3 and 4, one or more processing operations may be performed on the textual data corresponding to the natural language communication to generate normalized text. Referring now to FIG. 1, in at least one embodiment, the processor 102 is configured to, with the content of the memory 104, cause the apparatus 100 to predict at least one intention of the customer based, at least in part, on the normalized text corresponding to the natural language communication. To that effect, the apparatus 100 includes a prediction module 150 configured to facilitate prediction of customer intention (also interchangeable referred to herein as intent) prediction. The prediction module 150 is configured to predict at least one intention of the customer based, at least in part, on the normalized text corresponding to the natural language communication. More specifically, if in addition to the natural language communication provided by the customer, more multi-modal data, i.e. data corresponding to customer interaction on one or more enterprise interaction channels using one or more devices, is received corresponding to the customer, then the prediction module 150 may be caused to predict one or more intentions of the customer based on the normalized text and the additional multi-modal data. In an embodiment, the multi-modal data may also be converted into textual form if it includes non-textual portions. Further, the prediction module 150 may be configured to extract features from the textual data and provision the extracted features to classifiers. It is noted that the term textual data as used herein refers to the normalized text generated by performing one or more processing operations on the textual data corresponding to the natural language communication as well as remaining multi-modal data in the text form. The term 'classifier' as used herein corresponds to a machine learning model associated with learning algorithm from one among a state vector machine (SVM) based algorithm, a Markov model based algorithm, a logical reasoning (LR) based algorithm, a decision tree based algorithm, an artificial neural network based algorithm, a modified naïve Bayes based algorithm and a naïve Bayes based algorithm. The classifiers can be used to determine an intention of the customer (and in some cases, the customer's emotional state). Examples of the features that are extracted may include, but are not limited to, any combinations of words features such as n-grams, unigrams, bigrams and trigrams, word phrases, part-of-speech of words, sentiment of words, sentiment of sentences, position of words, customer keyword searches, customer click data, customer Web journeys, cross-channel journeys, call-flow, the customer interaction history and the like. In an embodiment, the classifiers may utilize any combination of the above-mentioned input features to predict the customer's likely intention. In some embodiments, the intention can be inferred and or predicted, based on prior or current activity, or can be specifically indicated by the customer. In some embodiments, machine learning and other artificial intelligence (AI) techniques may be used to monitor the predictions and the customer responses in order to improve the predictions.

The prediction module 150 may further be configured to evaluate the predicted customer's intent to provide guidance and to influence steps taken by the enterprise to engage the customer via one or more communications channels. For example, based on the one or more customer intents, products and services can be offered to the customer. The effectiveness of offering goods and services, for example, can be measured based on parameters including conversion of the customer into a purchasing entity, time of customer engagement, transcripts of the customer interaction, and so on. The effectiveness data can be used to update the machine-learning model, which is used to predict customer intent. In an embodiment, the classification can use canonical form to assign a customer intent on a statistical basis.

In an embodiment, the prediction module 150 may be configured to determine one or more recommendations for providing personalized treatment to the customer based on the predicted intent. In some example scenarios, the predicted intention may provide an insight into a future course of action most likely to be performed by the customer. Based on the predicted intention, the prediction module 150 may be caused to provide recommendations to improve the customer interaction experience and/or improve chances of a sale. Examples of the recommendations may include, but are not limited to, recommending up-sell/cross-sell products to the customer, suggesting products to up-sell/cross-sell to an agent as a recommendation, offering a suggestion for a discount to the agent as a recommendation, recommending a style of conversation to the agent during an interaction, presenting a different set of productivity or visual widgets to the agent to facilitate personalization of interaction with specific persona types on the agent interaction platform, presenting a different set of productivity or visual widgets to the customers with specific persona types on the customer interaction platform, proactive interaction, customizing the speed of interaction, customizing the speed of servicing information and the like.

In some example scenarios, the prediction module 150 may be caused to recommend routing the customer's interaction to the queue with the least waiting time or to the most suitable agent based on an agent persona type or a skill level associated with the agent. In another example embodiment, the recommendations may include offering discounts or promotional offers to the customer. In another example scenario, the recommendations for offering suitable real-time, online or offline campaigns to a customer segment may also be suggested. In at least one example embodiment, the prediction module 150 is caused to provide personalized interaction experience to the customer based on the one or more recommendations.

In at least one example embodiment, the processor 102 is configured to, with the content of the memory 104, cause the apparatus 100 to cause a provisioning of a reply to the customer based on predicted intention(s) or the one or more recommendations determined based on the prediction intention(s). In at least one embodiment, the reply may be provisioned to the customer on the at least one enterprise related interaction channel in response to the natural language communication. The provisioning of the response is explained with reference to illustrative examples in FIGS. 5A and 5B.

Figure 5A:
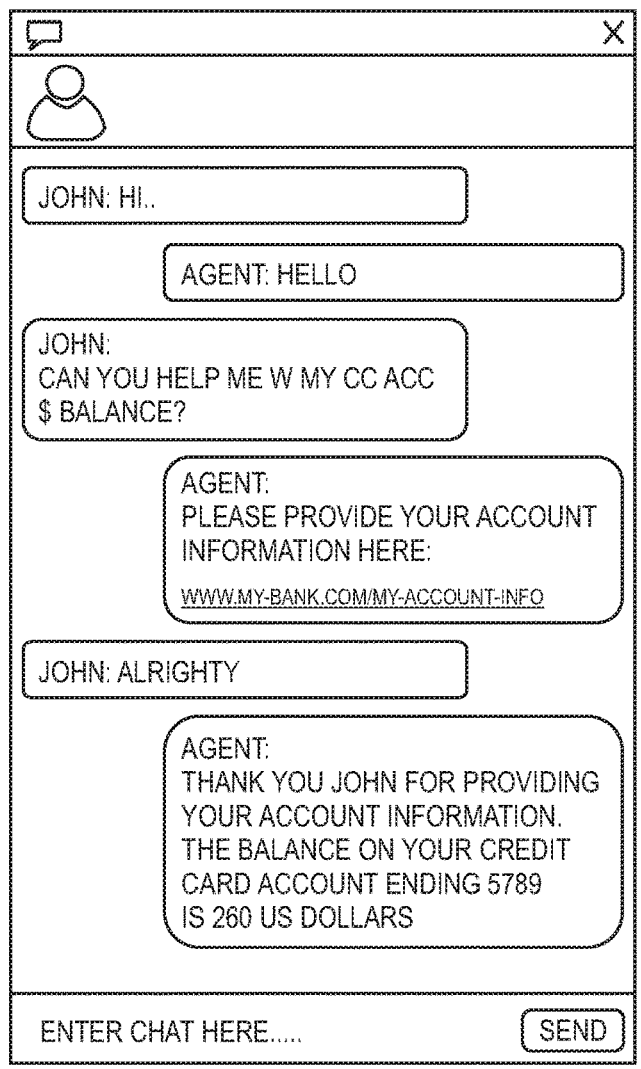
FIG. 5A shows a user interface showing a portion of an ongoing chat interaction between a customer and a customer support representative associated with an enterprise for illustrating a provisioning of a reply to the customer, in accordance with an embodiment of the invention.

Referring now to FIG. 5A, a user interface (UI) 500 showing a portion of an ongoing chat interaction between a customer and a customer support representative associated with an enterprise is depicted, in accordance with an embodiment of the invention. The UI 500 may correspond to a chat application displayed on an electronic device associated with the customer. The chat conversational lines corresponding to the customer are exemplarily depicted to be labeled as 'John', whereas the chat conversational lines corresponding to the customer support representative are exemplarily depicted to be associated with a label 'Agent'. In at least one example embodiment, the customer support representative may correspond to a virtual agent or a chat bot. The customer 'John' may initiate the interaction with a greeting and thereafter ask "Can U help me w my cc acc $ bal?" As explained with reference to FIG. 1, the communication interface 108 of the apparatus 100 may be configured to receive such natural language form of communication provided by the customer on the chat interaction channel and provision the natural language communication to the processor 102. The textual data generator 130 in the processor may first check the natural language communication for any non-textual portions. Since the natural language communication does not contain any non-textual portions, textual content corresponding to the natural language communication may configure the textual data. The normalization module 140 may be configured to perform one or more processing operations on the textual data as explained with reference to FIGS. 2 and 3 to generate normalized text.

In an example embodiment, the one or more processing operations performed on the textual data may generate normalized text as "can you help me with my credit card account dollar balance". Further, classifiers may be applied on the normalized text to determine that the customer's intent is to seek balance on his credit card. The apparatus 100 can then proceed to provision a reply, exemplarily depicted to be a weblink for the customer to provide his account number and authenticate himself. Once the customer has authenticated himself, the agent may provide a reply stating 'Thank you John for providing your account information. The balance on your credit card account ending 5789 is 260 US Dollars', thus satisfying the customer's intent for contacting the enterprise.

In some embodiments, the enterprise can also offer the customer additional products and services such as offering attractive interest rates for balance transfers, offering to redeem credit card points for goods, and so on.

Figure 5B:
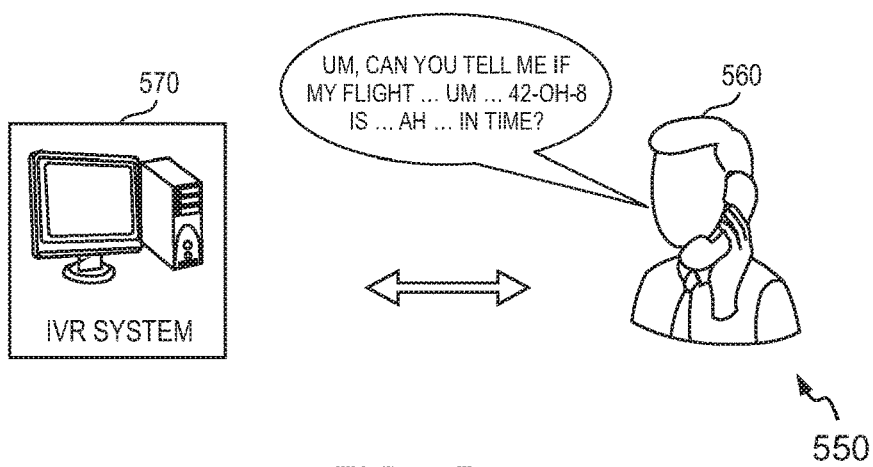
FIG. 5B shows a customer engaged in a voice conversation with an IVR system corresponding to an enterprise for illustrating a provisioning of a reply to the customer, in accordance with an embodiment of the invention.

FIG. 5B shows a representation 550 of customer 560 engaged in a voice conversation with an IVR system 570 corresponding to an enterprise, in accordance with an embodiment of the invention. The customer 560 may wish to check the status of an impending flight and may ask, "Um, can you tell me if my . . . flight . . . um . . . 42-Oh-8 is . . . ah . . . in time?" The communication interface 108 may receive such natural language communication provided by the customer 560 on the WR channel, and provision such information to the processor 102. The textual data generator 130 in the processor 102 may convert the voice portion of the natural language communication to text form to generate textual data. As explained with reference to FIG. 1, the textual data generator 130 may use speech-to-text conversions algorithms using automatic speech recognition and statistical language models to convert the speech portion into textual data. The normalization module 140 may then perform various processing operations on the textual data to generate normalized text as "can you tell me if my flight four two zero eight is on time". The prediction module 150 may be configured to apply classifiers to the normalized text to determine that the customer 560 is requesting a status report on their upcoming flight and can reply using the voice channel. In an illustrative example, the reply provisioned to the customer 560 may state 'We regret to inform you that your flight is delayed by an hour because of inclement weather'.

Figure 6:
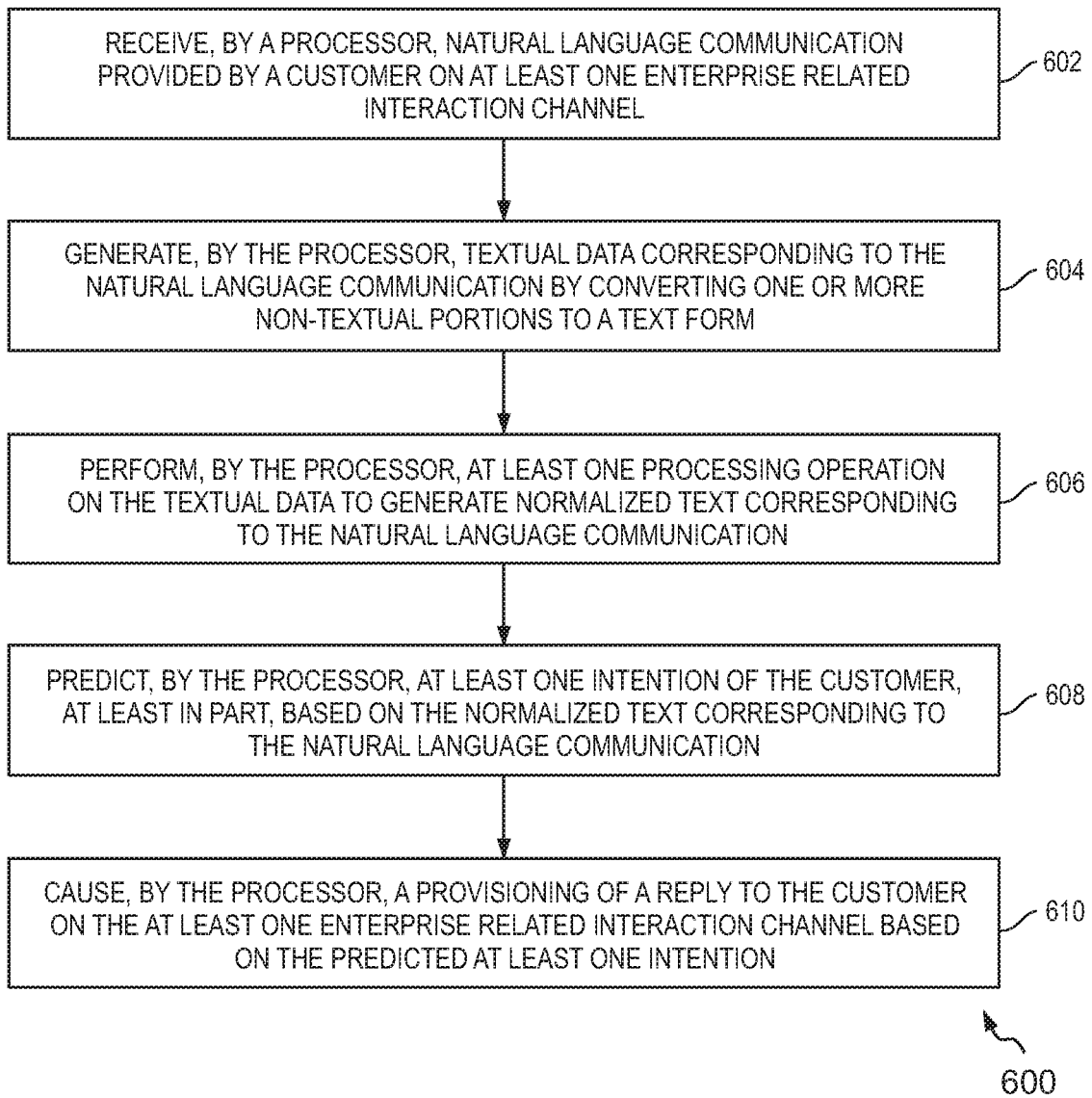
FIG. 6 is a flow diagram of an example method for facilitating customer intent prediction, in accordance with an embodiment of the invention.

FIG. 6 is a flow diagram of an example method 600 for facilitating customer intent prediction, in accordance with an embodiment of the invention. The method 600 depicted in the flow diagram may be executed by, for example, the apparatus 100 explained with reference to FIGS. 1 to 5B. Operations of the flowchart, and combinations of operation in the flowchart, may be implemented by, for example, hardware, firmware, a processor, circuitry and/or a different device associated with the execution of software that includes one or more computer program instructions. The operations of the method 600 are described herein with help of the apparatus 100. For example, one or more operations corresponding to the method 600 may be executed by a processor, such as the processor 102 of the apparatus 100. It is noted that although the one or more operations are explained herein to be executed by the processor alone, it is understood that the processor is associated with a memory, such as the memory 104 of the apparatus 100, which is configured to store machine executable instructions for facilitating the execution of the one or more operations. It is also noted that, the operations of the method 600 can be described and/or practiced by using an apparatus other than the apparatus 100. The method 600 starts at operation 602.

At operation 602 of the method 600, natural language communication provided by a customer on at least one enterprise related interaction channel is received. As explained with reference to FIG. 1, the term 'natural language communication' refers to general manner of communication between two individual entities. For example, a customer may ask, "How do I redeem my discount coupon?" to a chat agent. In another illustrative example, a customer may verbally request, "I need assistance in changing my voice plan" to a voice agent. Such form of communication, whether in verbal or textual form, may be termed as natural language communication. In addition to natural language communication, customer related data may also be received from other interaction channels and/or devices. For example, a customer may be present on an enterprise Website using a laptop device, while communicating on phone with an enterprise agent. Accordingly, multi-modal data, i.e. data corresponding to customer interaction from multiple interaction channels and devices may be received. The received multi-modal data may include the natural language information provided by the customer. It is noted that the multi-modal data may also include other information related to customer activity on one or more enterprise related interaction channels. For example, if the customer is also present on the Web channel (i.e. the enterprise Website), then information related to Web pages visited, time spent of each page, menu options selected etc. may be collated (for example, using JavaScript or HTML tags on the Web content) and provisioned by the Web server hosting the Website.

At operation 604 of the method 600, textual data corresponding to the natural language communication is generated. For example, one or more non-textual portions in the natural language communication are converted to a text form to generate textual data. However, textual content associated with the natural language communication configures the textual data if the natural language communication does not comprise non-textual portions. In at least one example embodiment, automatic speech recognition (ASR) and statistical learning models (SIM) may be used to perform speech-to-text conversion and thereby convert non-textual portions in text form.

At operation 606 of the method 600, at least one processing operation on the textual data is performed to generate normalized text corresponding to the natural language communication. The normalized text is configured to facilitate interpretation of the natural language communication provided by the customer. The normalization of the textual data may be performed to convert the multi-modal text data into meaningful, analyzable text. Some non-exhaustive examples of the operations performed for normalization of text include converting all characters in the textual data to lowercase letters, stemming, stop-word removal, spell checking, regular expression replacement, removing all characters and symbols that are not letters in the English alphabet, substituting symbols, abbreviations, and word classes with English words, and replacing two or more space characters, tab delimiters, and newline characters with a single space character, and the like. The various processing operations for generating normalized text may be performed as explained with reference to FIGS. 2, 3 and 4 and are not explained again herein.

At operation 608 of the method 600, at least one intention of the customer is predicted, at least in part, from the normalized text corresponding to the natural language communication. More specifically, if in addition to the natural language communication provided by the customer, if additional multi-modal data, i.e. data corresponding to customer interaction on one or more enterprise interaction channels using one or more devices, is received corresponding to the customer, then one or more intentions of the customer may be predicted based on the normalized text and the additional multi-modal data. In an embodiment, the multi-modal data may also be converted into textual form if it includes non-textual portions. Further, features may be extracted from the textual data and the extracted features may be provisioned to the classifiers. As explained with reference to FIG. 2, a classifier corresponds to a machine learning model associated with learning algorithm from one among a state vector machine (SVM) based algorithm, a Markov model based algorithm, a logical reasoning (TR) based algorithm, a decision tree based algorithm, an artificial neural network based algorithm, a modified naïve Bayes based algorithm and a naïve Bayes based algorithm. The classifiers can be used to determine an intention of the customer (and in some cases, the customer's emotional state).

At operation 610 of the method 600, a provisioning of a reply to the customer is caused based on the predicted at least one intention. The reply is provisioned to the customer on the at least one enterprise related interaction Channel in response to the natural language communication. The provisioning of the reply may be performed as explained with reference to FIGS. 5A and 5B and are not explained again herein.

In some embodiments, one or more recommendations may be determined for providing personalized treatment to the customer based on the predicted intent. Examples of the recommendations may include, but are not limited to, recommending up-sell/cross-sell products to the customer, suggesting products to up-sell/cross-sell to an agent as a recommendation, offering a suggestion for a discount to the agent as a recommendation, recommending a style of conversation to the agent during an interaction, presenting a different set of productivity or visual widgets to the agent to facilitate personalization of interaction with specific persona types on the agent interaction platform, presenting a different set of productivity or visual widgets to the customers with specific persona types on the customer interaction platform, proactive interaction, customizing the speed of interaction, customizing the speed of servicing information and the like.

In some example scenarios, a recommendation to route the customer's interaction to the queue with the least waiting time or to the most suitable agent based on an agent persona type or a skill level associated with the agent, may be determined. In another example embodiment, the recommendations may include offering discounts or promotional offers to the customer. In another example scenario, the recommendations for offering suitable real-time, online or offline campaigns to a customer segment may also be suggested.

Various embodiments disclosed herein provide numerous advantages. The techniques disclosed herein suggest developing a multi-modal model that can be used to analyze data captured from a customer via voice, chat and Web interactions, and then to better predict and understand the customer intent or intents behind initiating the interaction with the enterprise. Understanding customer intent permits the enterprise to more efficiently assist the customer, thus reducing cost. Further, knowing customer intent enables the enterprise to present relevant information, offers, products, and services to the customer, thus dramatically increasing the likelihood of satisfying customer need, converting the customer from a casual browser to a purchaser, and so on.

Furthermore, techniques disclosed herein for analysis of the customer data that is collected, serves to convert the data into a more generic or normalized form in order to simplify the classification of the data. Further, the classification of the customer data projects the customer data in a canonical form. The normalized data is projected into a feature space where every word in the data is a dimension in the feature space. The normalized data reduces the number of dimensions of the feature space thus simplifying the classification and better determining customer intent. For example, all telephone numbers detected in the customer data can be converted into a single form. Similarly, dates, URLs, email addresses, global locations, familial relationships, etc. all can be converted into single forms to simplify the classification, to reduce data noise, and to reduce classification errors. Similarly, the most likely corrections to mispronounced or misspelled words can be identified, also resulting in noise and errors reductions.

In some embodiments, the data collected from the multiple communications channels is used for cross-channel training, of the machine learning models. The model training is based on text normalization and classification. In some embodiments, the techniques suggested herein may be used to facilitate improved, context-based voice to text conversion for specific technical disciplines. Furthermore, in some embodiments, the suggested techniques may also aid in removing ambiguity in text conversion for emergency services handling.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 100, the processor 102, the memory 104, the I/O module 106 and the communication interface 108 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 3, 4 and 6). A computer-readable medium storing, embodying, or encoded with a computer program, or similar language, may be embodied as a tangible data storage device storing one or more software programs that are configured to cause a processor or a computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
receiving, by a processor, natural language communication provided by a customer on enterprise related interaction channels, the natural language communication comprising both textual content received from a chat channel and non-textual content received from a voice channel;
when the natural language communication comprises non-textual content received from the voice channel, converting, by the processor, the non-textual content to a text form to generate textual data corresponding to the natural language communication;
when the natural language communication comprises textual content received from the chat channel, using, by the processor, the textual content associated with the natural language communication to configure the textual data;
performing, by the processor, at least one processing operation on the textual data received from the voice channel and the chat channel to generate normalized text corresponding to the natural language communication, the processor configuring the normalized text to facilitate interpretation of the natural language communication provided by the customer, the at least one processing operation comprising substituting a word in the textual data received from the voice channel and from the chat channel with a word class corresponding to the word, wherein the word class represents a semantic category to which the word belongs;
extracting, by the processor, features from the normalized text;
provisioning, by the processor, the extracted features to one or more classifiers comprising a machine learning model associated with a learning algorithm;
using, by the processor, said one or more classifiers to predict at least one intention of the customer by projecting the normalized text into a feature space where a word in the normalized text is a dimension in the feature space; and causing, by the processor, a provisioning of a reply to the customer based on the at least one intention, the reply provisioned to the customer on at least one enterprise related interaction channel in response to the natural language communication.

2. The method of claim 1, further comprising:
performing, by the processor, a processing operation from among the at least one processing operation by:
determining if the textual data comprises one or more regularly used expressions;
when the textual data comprises the one or more regularly used expressions, determining if each regularly used expression from among the one or more regularly used expressions is expressed in a respective predetermined format; and
replacing a current format of at least one regularly used expression with the respective predetermined format if the at least one regularly used expression is not expressed in the respective predetermined format, wherein replacing the current format with the respective predetermined format facilitates, at least in part, generation of the normalized text.

3. The method of claim 2, wherein a regularly used expression from among the one or more regularly used expressions comprises any of a date expression, a time expression, a currency amount expression, an email expression, a phone number expression, and an account number expression.

4. The method of claim 1, further comprising:
performing, by the processor, a processing operation from among the at least one processing operation by removing non-English characters from the textual data, to facilitate, at least in part, generation of the normalized text.

5. The method of claim 1, further comprising:
performing, by the processor, a processing operation from among the at least one processing operation by substituting symbols with equivalent word representations to facilitate, at least in part, generation of the normalized text.

6. The method of claim 1, further comprising:
performing, by the processor, a processing operation from among the at least one processing operation by:
determining if the textual data comprises at least one word corresponding to any of a name of an individual, a relation of the individual, a profession of the individual, a gender of the individual, or a location of the individual; and
substituting the at least one word in the textual data with a respective word class to facilitate, at least in part, generation of the normalized text.

7. The method of claim 1, further comprising:
performing, by the processor, a processing operation from among the at least one processing operation by:
determining if one or more words from among a plurality of words configuring the textual data are extensions of word stems; and
replacing the one or more words with corresponding word stems to facilitate, at least in part, generation of the normalized text.

8. The method of claim 1, further comprising:
performing, by the processor, a processing operation from among the at least one processing operation by removing one or more stop-words present in the textual data to facilitate, at least in part, generation of the normalized text.

9. The method of claim 1, further comprising:
performing, by the processor, a processing operation from among the at least one processing operation by replacing at least one of abbreviations and acronyms in the textual data with corresponding full-word representations to facilitate, at least in part, generation of the normalized text.

10. The method of claim 1, further comprising:
performing, by the processor, a processing operation from among the at least one processing operation by replacing two or more consecutive white spaces, tab delimiters, and newline characters in the textual data with single spaces to facilitate, at least in part, generation of the normalized text.

11. The method of claim 1, further comprising:
performing, by the processor, a processing operation from among the at least one processing operation by:
performing a spelling check of words configuring the textual data; and
when one or more words with incorrect spellings are identified in the textual data during the spelling check, correcting the incorrect spellings of one or more words in the textual data to facilitate, at least in part, generation of the normalized text.

12. The method of claim 11, further comprising:
performing the spelling check by:
generating at least one list of words based on pre-defined criteria;
configuring a set of parameters for performing the spelling check;
for each word in the textual data, determining if the word exists in a dictionary;
when the word exists in the dictionary, checking if the word is present in the at least one list of words;
classifying the word if the word is present in the at least one list of words;
when the word does not exist in the dictionary, identifying one or more suggestions for the word;
scoring each suggestion from among the one or more suggestions based on an order of relevance; and
correcting the incorrect spellings based on scores associated with the one or more suggestions.

13. The method of claim 12, further comprising:
generating an n-gram model;
using said n-gram model to determine a context of the word in the textual data; and
scoring the each suggestion from among the one or more suggestions based on the context of the word.

14. The method of claim 13, further comprising:
scoring the each suggestion with at least one of an error model and a statistical language model.

15. The method of claim 1, further comprising:
determining, by the processor, one or more recommendations for providing a personalized treatment to the customer based on the predicted at least one intention; and
provisioning the reply to the customer based on the one or more recommendations.

16. The method of claim 1, further comprising:
receiving, by the processor, multi-modal data corresponding to a customer interaction on the at least one enterprise related interaction channel, wherein the multi-modal data comprises the natural language communication.

17. An apparatus, comprising:
at least one processor; and
a memory having stored therein machine executable instructions, that when executed by the at least one processor, cause the apparatus to:
receive natural language communication provided by a customer on enterprise related interaction channels, said natural language communication comprising both textual content received from a chat channel and non-textual content received from a voice channel;
when the natural language communication comprises non-textual content received from the voice channel, convert the non-textual content to a text form to generate textual data corresponding to the natural language communication;
when the natural language communication comprises textual content received from the chat channel, use the textual content associated with the natural language communication to configure the textual data;
perform at least one processing operation on the textual data received from the voice channel and the chat channel to generate normalized text corresponding to the natural language communication, the normalized text facilitating interpretation of the natural language communication provided by the customer, the at least one processing operation comprising substituting a word in the textual data received from the voice channel and from the chat channel with a word class corresponding to the word, wherein the word class represents a semantic category to which the word belongs;
extract features from the normalized text;
provision the extracted features to one or more classifiers comprising a machine learning model associated with a learning algorithm;
use said one or more classifiers to predict at least one intention of the customer by projecting the normalized text into a feature space where a word in the normalized text is a dimension in the feature space; and
cause a provisioning of a reply to the customer based on the at least one intention, the reply provisioned to the customer on at least one enterprise related interaction channel in response to the natural language communication.

18. The apparatus of claim 17, further comprising:
for performing a processing operation from among the at least one processing operation, the apparatus is caused to:
determine if the textual data comprises one or more regularly used expressions;
when the textual data comprises the one or more regularly used expressions, determine if each regularly used expression from among the one or more regularly used expressions is expressed in a respective predetermined format; and
replace a current format of at least one regularly used expression with the respective predetermined format if the at least one regularly used expression is not expressed in the respective predetermined format to facilitate, at least in part, generation of the normalized text.

19. The apparatus of claim 17, further comprising:
for performing a processing operation from among the at least one processing operation, the apparatus is caused to remove non-English characters from the textual data to facilitate, at least in part, generation of the normalized text.

20. The apparatus of claim 17, further comprising:
for performing a processing operation from among the at least one processing operation, the apparatus is caused to substitute symbols with equivalent word representations to facilitate, at least in part, generation of the normalized text.

21. The apparatus of claim 17, further comprising:
for performing a processing operation from among the at least one processing operation, the apparatus is caused to:
determine if the textual data comprises at least one word corresponding to any of a name of an individual, a relation of the individual, a profession of the individual, a gender of the individual, or a location of the individual; and
substitute the at least one word in the textual data with a respective word class to facilitate, at least in part, generation of the normalized text.

22. The apparatus of claim 17, further comprising:
for performing a processing operation from among the at least one processing operation, the apparatus is caused to:
determine if one or more words from among a plurality of words configuring the textual data are extensions of word stems; and
replace the one or more words with corresponding word stems to facilitate, at least in part, generation of the normalized text.

23. The apparatus of claim 17, further comprising:
for performing a processing operation from among the at least one processing operation, the apparatus is caused to remove one or more stop-words present in the textual data to facilitate, at least in part, generation of the normalized text.

24. The apparatus of claim 17, further comprising:
for performing a processing operation from among the at least one processing operation, the apparatus is caused to replace at least one of abbreviations and acronyms in the textual data with corresponding full-word representations to facilitate, at least in part, generation of the normalized text.

25. The apparatus of claim 17, further comprising:
for performing a processing operation from among the at least one processing operation, the apparatus is caused to replace two or more consecutive white spaces, tab delimiters, and newline characters in the textual data with single spaces to facilitate, at least in part, generation of the normalized text.

26. The apparatus of claim 17, further comprising:
for performing a processing operation from among the at least one processing operation, the apparatus is caused to:
perform a spelling check of words configuring the textual data; and
when one or more words with incorrect spellings are identified in the textual data during the spelling check, correct the incorrect spellings of one or more words in the textual data to facilitate, at least in part, generation of the normalized text.

27. The apparatus of claim 17, further comprising:
for performing a spelling check, the apparatus is caused to:
facilitate generation of at least one list of words based on predefined criteria;
facilitate configuration of a set of parameters for performing the spelling check;

for each word in the textual data, determine if the word exists in a dictionary;

when the word exists in the dictionary, check if the word is present in the at least one list of words and facilitating classification of the word if the word is present in the at least one list of words; and when the word does not exist in the dictionary, identify one or more suggestions for the word, score each suggestion from among the one or more suggestions based on an order of relevance, and perform a correction of incorrect spellings based on scores associated with the one or more suggestions.

28. The apparatus of claim 27, wherein the apparatus is further caused to:

generate an n-gram model for determining a context of the word in the textual data; and score the each suggestion from among the one or more suggestions based on the context of the word.

29. The apparatus of claim 17, wherein the apparatus is further caused to:

determine one or more recommendations for providing a personalized treatment to the customer based on the predicted at least one intention, and provision the reply to the customer based on the one or more recommendations.

30. An apparatus, comprising:

at least one communication interface configured to receive natural language communication provided by a customer on enterprise related interaction channels, said natural language communication comprising both textual content received from a chat channel and non-textual content received from a voice channel;

a textual data generator configured to convert the non-textual content received from the voice channel to a text form to generate textual data corresponding to the natural language communication;

said textual data generator configured to use textual content associated with the natural language communication to configure the textual data when the natural language communication comprises the textual content received from the chat channel;

a normalization module configured to perform at least one processing operation on the textual data received from the voice channel and the chat channel to generate normalized text corresponding to the natural language communication, the normalized text configured to facilitate interpretation of the natural language communication provided by the customer, the at least one processing operation comprising substituting a word in the textual data received from the voice channel and from the chat channel with a word class corresponding to the word, wherein the word class represents a semantic category to which the word belongs; and a prediction module configured to:

extract features from the normalized text;

provision the extracted features to one or more classifiers comprising a machine learning model associated with a learning algorithm; and use said one or more classifiers to predict at least one intention of the customer by projecting the normalized text into a feature space where a word in the normalized text is a dimension in the feature space;

wherein the at least one communication interface is caused to provision a reply to the customer based on at least one intention, the reply provisioned to the customer on at least one enterprise related interaction channel in response to the natural language communication.

31. The apparatus of claim 30, wherein the normalization module further comprises:

a regular expression module configured to replace a current format of at least one regularly used expression in the textual data with a respective predetermined format if the at least one regularly used expression is not expressed in the respective predetermined format;

a character removal module configured to remove non-English characters from the textual data;

a symbol substitution module configured to substitute symbols in the textual data with equivalent word representations;

a word class substitution module configured to substitute at least one word in the textual data with a respective word class;

a stemming module configured to replace one or more words in the textual data with corresponding word stems;

a stop-word removal module configured to remove stop-words in the textual data;

a short form replacement module configured to replace at least one of abbreviations and acronyms in the textual data with corresponding full-word representations;

a white space removal module configured to replace two or more consecutive white spaces, tab delimiters and newline characters in the textual data with single spaces; and a spell checker module configured to perform a spelling check of words configuring the textual data and correcting incorrect spellings of one or more words in the textual data if the one or more words with incorrect spellings are identified in the textual data.

32. The apparatus of claim 31, wherein for performing the spelling check, the spell checker module is caused to:

facilitate generation of at least one list of words based on predefined criteria;

facilitate configuration of a set of parameters for performing the spelling check;

for each word in the textual data, determine if the word exists in a dictionary;

if the word exists in the dictionary, check if the word is present in the at least one list of words and facilitating classification of the word if the word is present in the at least one list of words; and if the word does not exist in the dictionary, identify one or more suggestions for the word, wherein each suggestion from among the one or more suggestions is scored based on an order of relevance, and wherein a correction of the incorrect spellings is performed based on scores associated with the one or more suggestions.

33. The apparatus of claim 32, wherein the spell checker module is further caused to:

generate an n-gram model for determining a context of the word in the textual data; and score the each suggestion from among the one or more suggestions based on the context of the word.

34. The apparatus of claim 30, wherein the apparatus is further caused to:

determine one or more recommendations for providing a personalized treatment to the customer based on the predicted at least one intention, wherein the reply is provisioned to the customer based on the one or more recommendations.

* * * * *